United States Patent [19]
Takagi et al.

[11] Patent Number: 5,140,458
[45] Date of Patent: Aug. 18, 1992

[54] OPTICAL ILLUMINATING AND OBSERVING APPARATUS

[75] Inventors: Kazutoshi Takagi; Nobuaki Kitazima; Yoshitaka Torii, all of Tokyo, Japan

[73] Assignee: Kabushiki Kaisha Topcon, Japan

[21] Appl. No.: 329,898

[22] PCT Filed: Jun. 30, 1988

[86] PCT No.: PCT/JP88/00654
§ 371 Date: Apr. 27, 1989
§ 102(e) Date: Apr. 27, 1989

[87] PCT Pub. No.: WO89/00298
PCT Pub. Date: Jan. 12, 1989

[30] Foreign Application Priority Data
Jun. 30, 1987 [JP] Japan .................. 62-162706

[51] Int. Cl.⁵ ................ G02B 7/02; G02B 21/06
[52] U.S. Cl. .................... 359/380; 359/385; 359/432
[58] Field of Search ................ 350/507-514, 350/521-531, 500, 515-520, 570; 250/201; 351/206, 211, 214, 221; 359/368-369, 379-390, 693-698, 702

[56] References Cited
U.S. PATENT DOCUMENTS

| | | | |
|---|---|---|---|
| 4,232,933 | 11/1980 | Nakahashi | 350/19 |
| 4,235,540 | 11/1980 | Hanamura | 354/62 |
| 4,265,518 | 5/1981 | Matsumura | 351/206 |
| 4,331,392 | 5/1982 | Sato | 351/14 |
| 4,363,532 | 12/1982 | Weber | 350/523 |
| 4,443,076 | 4/1984 | Itabashi | 350/519 |
| 4,558,932 | 12/1985 | Nunokawa | 351/206 |
| 4,571,038 | 2/1986 | Iako | 350/507 |
| 4,634,240 | 1/1987 | Suzuki et al. | 350/527 |
| 4,650,296 | 3/1987 | Tsuchiya | 350/519 |
| 4,725,720 | 2/1988 | Sawada et al. | 250/201 |

*Primary Examiner*—Bruce Y. Arnold
*Assistant Examiner*—Thong Nguyen
*Attorney, Agent, or Firm*—Brumbaugh, Graves, Donohue & Raymond

[57] ABSTRACT

An optical illuminating and observing apparatus having a first drive system for changing the magnification of the apparatus and a second drive system for changing the illuminating field of the apparatus. The two drive systems can be operated either in an interlocking relationship or independently of each other. In a preferred embodiment, a clutch-gear is used to connect and disconnect the two drive systems to or from each other.

6 Claims, 6 Drawing Sheets

OPTICAL ILLUMINATING AND OBSERVING APPARATUS

TECHNICAL FIELD

The present invention relates to an optical illuminating and observing apparatus comprising an optical observing system and an optical illuminating system, in which the observing magnification of the optical observing system and the illuminating field of the optical illuminating system can be changed, respectively.

BACKGROUND ART

A typical example of such instruments includes medical optical instruments such as surgical microscopes, slit-lamps, retinal cameras and other instruments. These medical optical instruments comprise an optical illuminating system for illuminating an object to be observed and an optical observing system for observing the object.

Such optical instruments are classified into an independent type in which the illuminating field of the optical illuminating system can be changed completely independently of the magnification of the optical observing system and an interlocking type in which both the optical systems can be interlocked at all times.

The independent type optical instruments are troublesome in operation since the illuminating system should be independently adjusted to change its illuminating field for each change of magnification in the optical observing system.

On the other hand, the interlocking type optical illuminating and observing instruments are not troublesome in operation. However, they can always be used only in combinations of lower observing magnification—wider illuminating field and higher observing magnification—narrower illuminating field. Therefore, the interlocking type optical instruments cannot meet various requirements where a part of the observing field or a part of an object to be observed should be more brightly illuminated although the observing magnification may not be very increased with the illuminating field being decreased or where the effective exit pupil of the illuminating system is to be located nearer the optical axis for observation as in the operation on the cataract by the use of a surgical microscope.

It is therefore an object of the present invention to overcome the aforementioned disadvantages of the optical instruments according to the prior art and to provide an optical illuminating and observing apparatus having the advantages in both the independent and interlocking type optical instruments.

DISCLOSURE OF INVENTION

To this end, the present invention provides an optical illuminating and observing apparatus comprising an optical observing system; means for changing the observing magnification of said optical observing system; an optical illuminating system; means for changing the illuminating field of said optical illuminating system; and selective drive means for selectively driving said magnification changing means and said field changing means in interlocking or non-interlocking mode.

In one aspect of the present invention, the optical illuminating and observing apparatus is characterized by the fact that said magnification changing means comprises an optical magnification changing system, a first driving mechanism for driving said optical magnification changing means and drive means for providing a driving force to said first driving mechanism; said field changing means comprising an optical illuminating field changing system and a second driving mechanism for driving said optical illuminating field changing means; and said selective drive means comprising a connecting mechanism selectively connected with said second driving mechanism to transmit the driving force from said drive means to said second driving mechanism.

In another aspect of the present invention, the optical illuminating and observing apparatus is characterized in the fact that said magnification changing means comprises an optical magnification changing system, a first driving mechanism for driving said optical magnification changing system and a first motor for providing a driving force to said first driving mechanism; said field changing means comprising an optical illuminating field changing system, a second driving mechanism for driving said optical illuminating field changing system and a second motor for providing a driving force to said second driving mechanism; and said selective drive means comprising a control circuit for controlling said first and second motors to actuate them simultaneously or independently.

The present invention can thus provide an optical illuminating and observing apparatus having the advantages in both the independent and interlocking type optical instruments constructed according to the prior art since the magnification changing means and the field changing means in the present invention can be selectively actuated in either of the independent or interlocking mode.

BEST MODE FOR CARRYING OUT THE INVENTION (First Embodiment)

Figure 1:
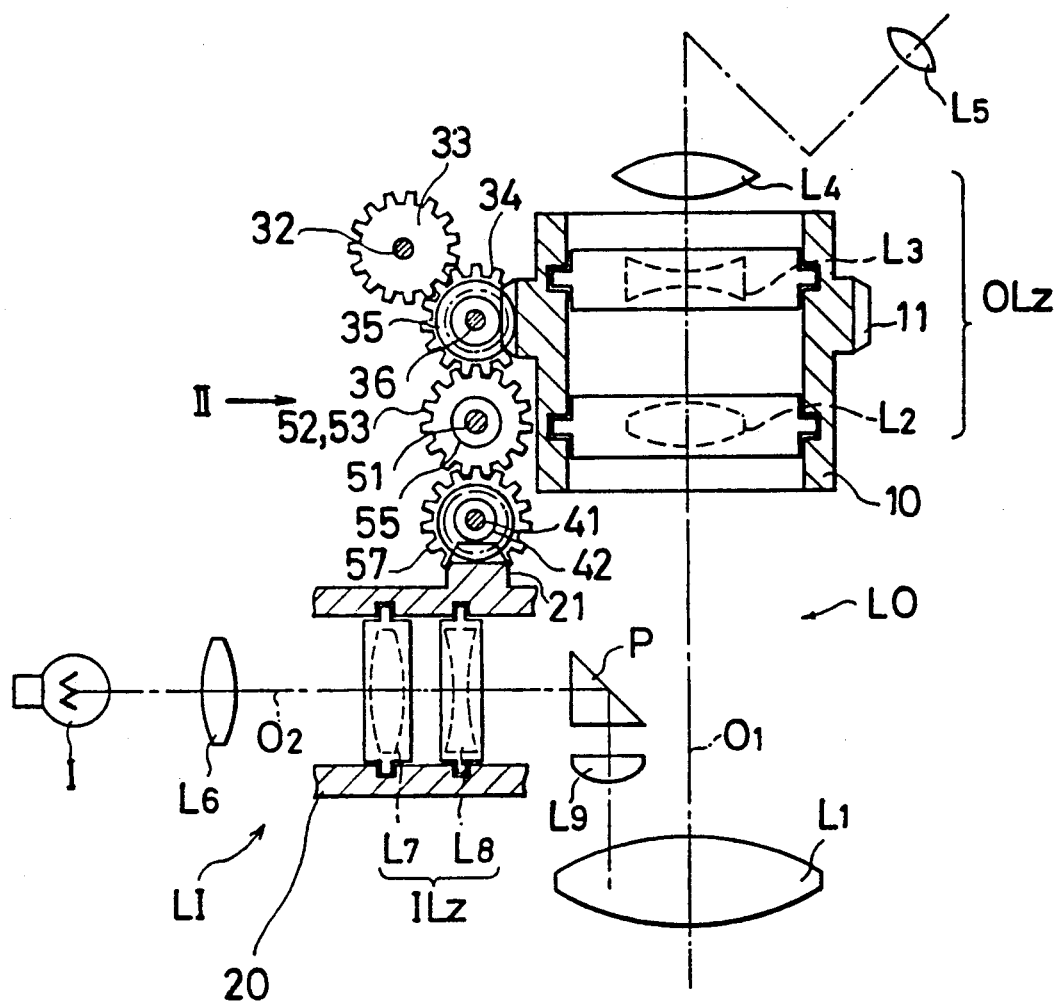
FIG. 1 is a longitudinal cross-section of the first embodiment of the present invention.
Figure 2:
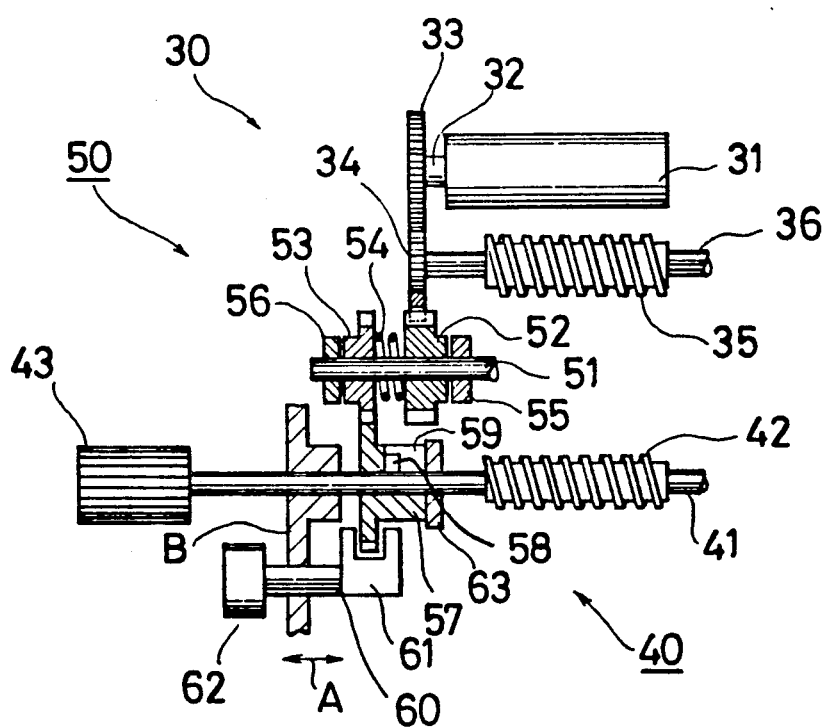
FIG. 2 is a longitudinal cross-section of the same, as viewed in the direction of arrow II in FIG. 1.

Referring now to FIGS. 1 and 2, the first embodiment of the present invention shown herein comprises an optical observing system LO which consists of a single objective lens $L_1$; a binocular zooming system $OL_z$ (only the left-hand system shown in FIG. 1 for simplification) consisting of a convex lens $L_2$, a concave lens $L_3$ and another convex lens $L_4$; a binocular eyepiece $L_5$ (only the left-hand eyepiece shown in FIG. 1). The first embodiment also comprises an optical illuminating system LI which consists of a source of illuminating light I; a condensing lens $L_6$; a zoom illumination system $IL_z$ defined by a convex lens $L_7$ and a concave lens $L_8$ as an illuminating field changing system; a reflective prism P and an imaging lens $L_9$.

In the optical observing system LO; the lenses $L_2$ and $L_3$ of the zooming system $OL_z$ can be moved along the optical axis $O_1$ to change the magnification for observation, by means of a known lens moving mechanism which includes a cam lens-barrel 10. On the other hand, the lenses $L_7$ and $L_8$ of the zoom illumination system $IL_z$ in the optical illuminating system LI can be moved along the optical axis $O_2$ to change the magnitude of the illuminating field, by means of a known lens moving mechanism which includes a cam lens-barrel 20.

The zooming system $OL_z$ may be driven by a first driving mechanism 30 which consists of a motor 31 as a source of driving force; a gear 33 rigidly mounted about the output shaft 32 of the motor 31; a gear 34 engaged by the gear 33; a driving shaft 36 firmly connected at one end with the gear 34 and including a worm gear 35 on the intermediate portion between the opposite ends of the driving shaft 36; and a worm gear 11 formed on and about the outer periphery of the cam lens-barrel 10 and engaged by the worm gear 35. In such an arrangement, when the motor 31 is energized to rotate, the worm gear 11 is rotated to move the lenses $L_2$ and $L_3$ along the optical axis $O_1$ through the known camming mechanism to change the magnification for observation.

The zoom illumination system $IL_z$ may be driven by a second driving mechanism 40 which consists of a driving shaft 41 having a worm gear 42 on the intermediate part between the opposite ends thereof and having a manually rotatable knob 43 at one end; and a worm gear 21 formed on and about the outer periphery of the cam lens-barrel 20 and engaged by the worm gear 42.

In the first embodiment of the present invention, there is a connecting mechanism 50 disposed between the gear 34 of the first driving mechanism 30 and the driving shaft 41 of the second driving mechanism 40. The connecting mechanism 50 provides a clutch-gear mechanism comprising an intermediate shaft 51 rotatably supported on bearing means (not shown), a gear 52 rotatably mounted about the intermediate shaft 51, a gear 53 rigidly mounted about the intermediate shaft 51, a spring 54 operatively disposed between the gears 52 and 53, stopper rings 55 and 56 rigidly mounted about the intermediate shaft 51 to limit the axial movement of the gears 52 and 53 so that these gears are brought into engagement with the respective stopper rings 55 and 56 in a predetermined frictional force under the action of the spring 54. The connecting mechanism 50 further comprises a gear 57 slidably mounted on the driving shaft 41 of the second driving mechanism 40 and having a hub formed with an axial slot 59 which is engaged by a pin 58 formed on the driving shaft 41, the rotational force of the gear 57 being transmitted to the driving shaft 41; and a connecting and operating member 60 slidably supported by a housing wall B to move in the direction of arrow A, the member 60 having at one end a bifurcated piece 61 disposed to receive the teeth of the gear 57, the other end thereof having a knob 62 which is located outside of the housing wall B. Moreover, a stopper ring 63 is rigidly mounted on the driving shaft 41 to limit the axial movement of the gear 57.

The function of the first embodiment will now be described with reference to FIGS. 5A through 5D wherein the relationship between the observing magnification and the illuminating field is diagrammatically illustrated. As shown in FIG. 2, when the knob 62 of the connecting and operating member 60 is forced inwardly toward the housing wall B, the bifurcated piece 61 of the member 60 is then moved to shift the gear 57 into engagement with the stopper ring 58 on the driving shaft 41. The gear 57 is then engaged by the gear 53 to interlock the first driving mechanism with the second driving mechanism.

Figure 5A:
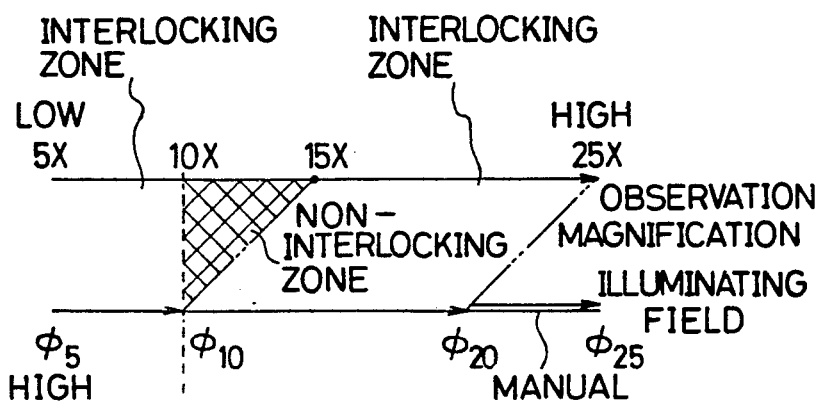
FIGS. 5A through 5D are a series of diagrams which show the relationship between the observing magnification and the illuminating field and useful for explaining the function of the first embodiment of the present invention.

When the motor 31 is energized in such a situation, the worm gear 35 is driven to rotate the cam lens-barrel 10 such that the lenses $L_2$ and $L_3$ in the zooming system will be shifted to change the magnification. At the same time, the rotation of the motor 31 is transmitted to rotate the worm gear 42 through the gear train (33, 34, 52, 53 and 57) to rotate the cam lens-barrel 20 such that the lenses $L_7$ and $L_8$ in the zoom illuminating system will be shifted to change the illuminating field in connection with the change of magnification in the zooming system $OL_z$. For example, when the observing magnification is changed from 5X to 10X as shown in FIG. 5A, the illuminating field is simultaneously changed from $\phi_5$ to $\phi_{10}$.

When the observing magnification is in 10X and if the knob 62 of the connecting and operating member 60 is moved outwardly away from the housing wall B, the bifurcated piece 61 then moves the gear 57 into disengagement with the gear 53 so that the non-interlocking condition will be set.

As the motor 31 is further rotated in this non-interlocking condition, the worm gear 35 is rotated to further move the lenses $L_2$ and $L_3$ to increase the observing magnification. However, the rotation of the motor 31 is interrupted at the gear 53 of the gear train (33, 34, 52 and 53) to stop the worm gear 42. Therefore, the lenses $L_7$ and $L_8$ will not be moved to further decrease the illuminating field. In other words, the illuminating field will be maintained at $\phi_{10}$ corresponding to the observing magnification 10X although the latter is increased from 10X to 15X as in FIG. 5A.

When the motor 31 is further rotated after the connecting and operating member 60 is operated to engage the gear 57 with the gear 53 to set the interlocking condition, the illuminating field in the zoom illuminating system is changed in connection with the change of the zooming rate. However, the change of the illuminating field is initiated at the last illuminating field in the previous interlocking condition. In other words, the illuminating field is changed from $\phi_{10}$ although the change of the observing magnification is initiated from 15X in FIG. 5A.

Figure 5B:
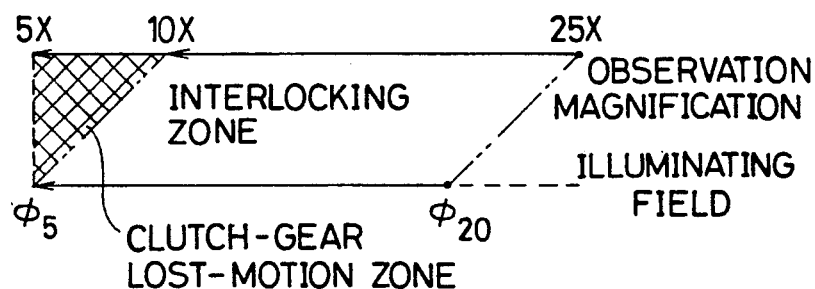

This means that the illuminating field can be changed only up to a value $\phi_{20}$ even if the observing magnification is increased to the maximum magnification 25X to move the lenses $L_2$ and $L_3$ to its maximum movement point. At this time, the connecting and operating member 60 may be manipulated to reset the non-interlocking condition. The manual rotatable knob 43 may be also actuated to rotate the worm gear 42 to move the lenses $L_7$ and $L_8$ such that the illuminating field will be changed to the limit thereof, $\phi_{25}$. Alternatively, the connecting and operating member 60 may not be manipulated to maintain the interlocking condition while the motor 31 may be reversed in rotation. As shown in FIG. 5B, therefore, the illuminating field will be returned from $\phi_{20}$ back to $\phi_5$ while the observing magnification is returned from the maximum level 25X back to the minimum level 5X. As the observing magnification is returned to 10X, the illuminating field reaches the maximum level, $\phi_5$. Since at this time the lenses $L_7$ and $L_8$ reaches their maximum illuminating field, the cam lens-barrel 20 in the zoom illuminating system $IL_z$ cannot be further rotated even though the motor 31 is energized to return the observing magnification to 5X. Thus, the gear train consisting of the worm gears 21, 42, the gear 57 and gear 53 serves as braking means.

As the worm gear 35 is further rotated by the energization of the motor 31, the gear 52 engaged by the gear 34 will have a lost-motion zone since the gear 53 is braked. In this lost-motion zone, the gear 52 is run idle about the intermediate shaft 51 against the frictional connecting force between the gear 53 and the spring 54 in the clutch-gear mechanism. Therefore, the motor 31 is energized only to rotate the worm gear 35 such that merely the zooming system $OL_z$ will be actuated to return the observing magnification to the minimum level, 5X. Thereafter, if the motor 31 is reenergized forwardly, the first driving mechanism can be interlocked again with the second driving mechanism to change the observing magnification and the illuminating field simultaneously.

Figure 5C:
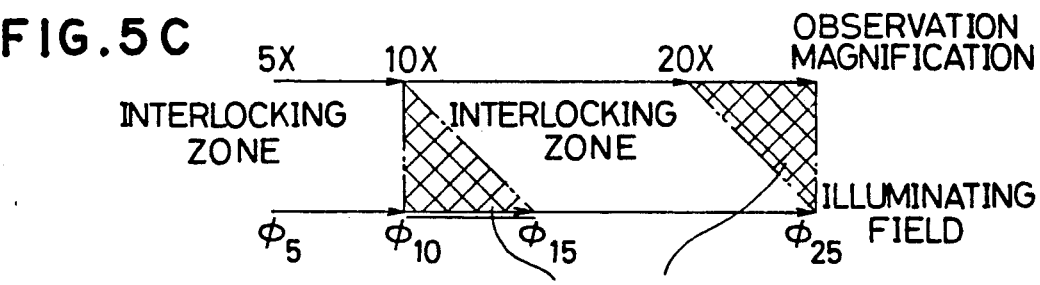

FIG. 5C illustrates the case where the first driving mechanism is actuated with the second driving mechanism interlocked therewith to obtain the observing magnification equal to 10X and thereafter the connecting and operating member 60 is actuated to release the first and second driving mechanisms 30, 40 from each other so that the manual rotatable knob 43 can be manipulated to decrease the illuminating field to $\phi_{15}$ independently. When it is wanted to change the illuminating field independently, the knob 43 can be more easily manipulated by operating the connecting and operating member 60 to release the interlocking condition. In the first embodiment, however, only the rotation of the knob 43 can rotate the driving shaft 41 without disengagement of the first driving mechanism 30 with the second one 40. Even if the rotation of the driving shaft 41 is transmitted to the gears 57 and 53, the gear 53 will be rotated in lost-motion into the idle zone in the clutch-gear mechanism to arrest the motion of the first driving mechanism since the first embodiment is so arranged that the frictional connecting force between the gears 52 and 53 defining the clutch-gear mechanism under the action of the spring 54 is smaller than the engaging force in the gear train including the cam lens-barrel 10, the worm gears 11, 35 and the gears 34, 52.

When the first driving mechanism is again interlocked with the second driving mechanism after the illuminating field has been changed independently up to $\phi_{15}$ and if the motor 31 is energized to provide a higher magnification and a narrower illuminating field, the example shown in FIG. 5C will be that the illuminating field reaches its minimum level $\phi_{25}$ at the same time as the observing magnification becomes 20X.

Figure 5D:
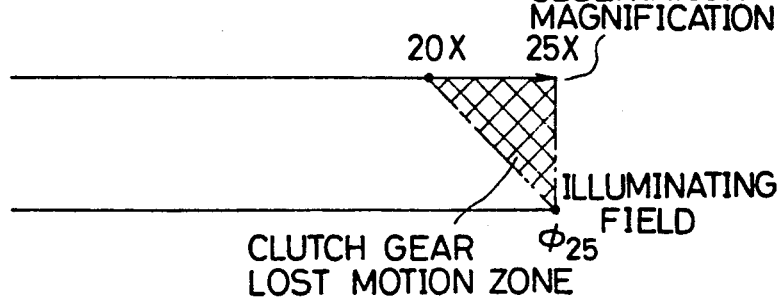

As the motor 31 is further energized, the gears 52 and 53 will be rotated in the lost-motion against the frictional connecting force from the spring 54 to actuate only the zooming system since the zoom illuminating system has already reached its limit point, as shown in FIG. 5D.

(Second Embodiment)

Figure 3:
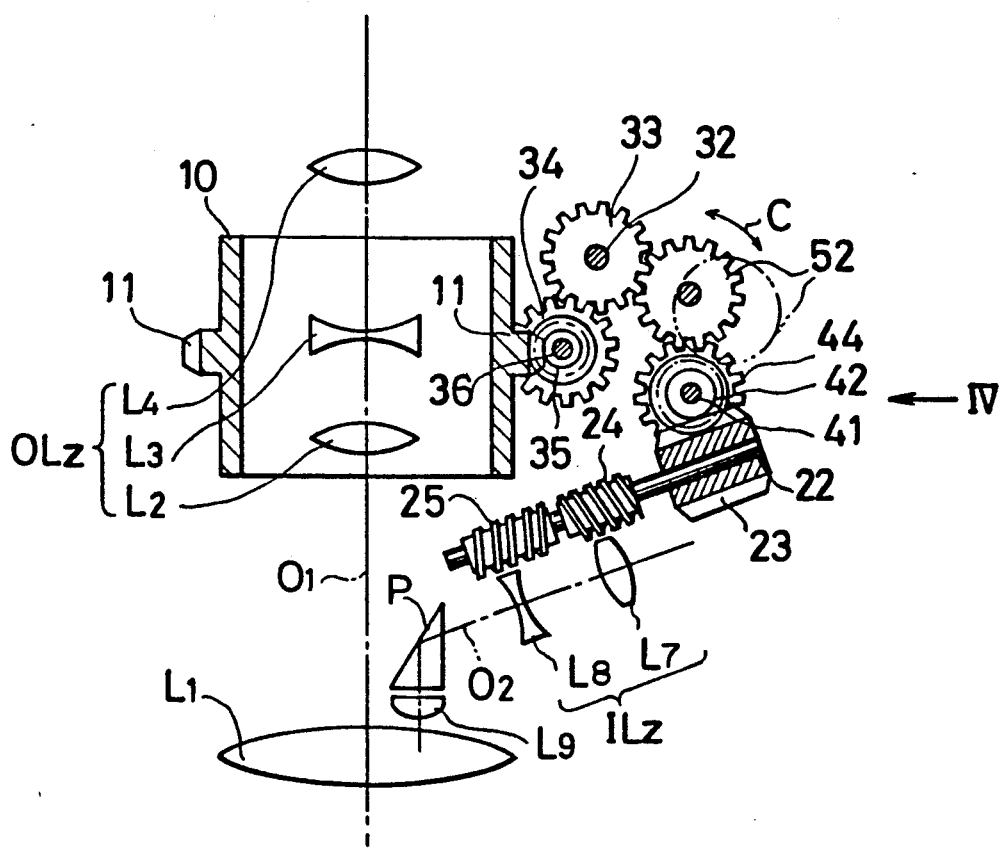
FIG. 3 is a longitudinal cross-section of the second embodiment of the present invention.
Figure 4:
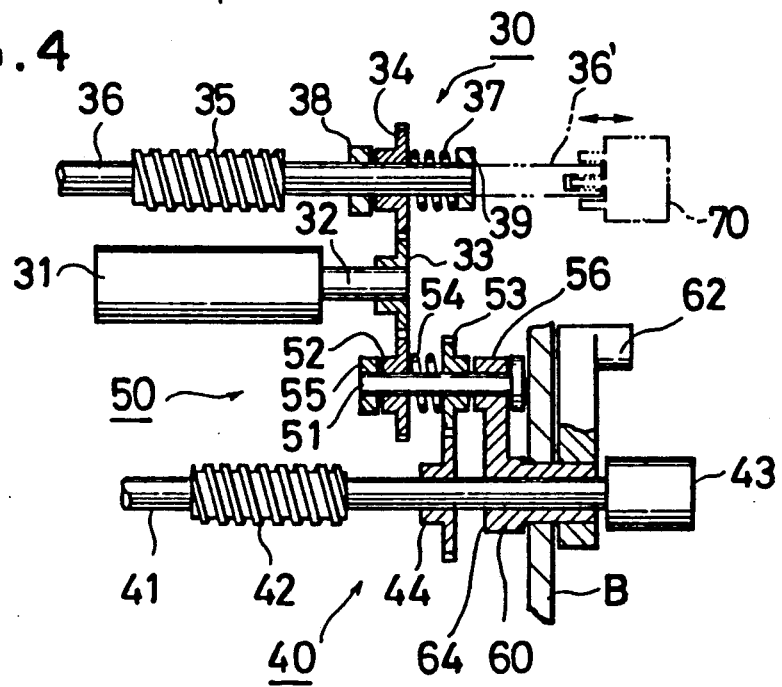
FIG. 4 is a longitudinal cross-section of the second embodiment, as viewed in the direction of arrow IV in FIG. 3.

The second embodiment of the present invention is shown in FIGS. 3 and 4 wherein parts similar to those in the first embodiment are designated by similar reference numerals and will not be described further.

The difference of the second embodiment from the first embodiment is that the second driving mechanism 40 for actuating the zoom illuminating system $IL_z$ comprises a third driving shaft 22 having a worm gear 23 formed thereon and engaged by the worm gear 42, and feed screws 24 and 25. The rotation of the second driving shaft 41 is transmitted to the third driving shaft 22 to move the lenses $L_7$ and $L_8$ along the optical axis $O_2$ through the feed screws 24 and 25 in the known manner. The connecting and operating member 60 is in the form of a rotatable arm 64 which is rotatably fitted about the second driving shaft 41 and which is connected with a manipulating knob 62. The intermediate shaft 51 in the connecting mechanism 50 is rotatably mounted on the rotatable arm 64 at one end. A gear 44 is rigidly mounted on the second driving shaft. Finally, the gear 34 in the first driving mechanism is rotatably fitted over the first driving shaft 36 and provides part of a clutch-gear mechanism defined by a spring 37 and stopper rings 38 and 39. Thus, the gear 34 is biased toward one of the stopper rings 38 under the action of the spring 37.

In such an arrangement, the interlocking condition between the first and second driving mechanisms 30 and 40 can be set by rotating the manipulating knob 62 about the second driving shaft 41 in the direction of arrow C in FIG. 3 so that the gear 52 in the clutch-gear mechanism will be engaged with the gear 34 through the gear 33 rigidly mounted on the output shaft 32 of the motor 31. The non-interlocking condition can be set by separating the gear 33 away from the gear 52.

Figure 6:
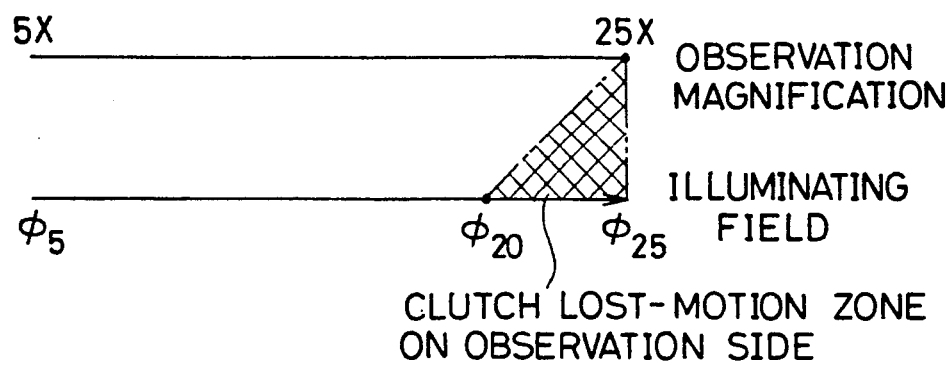
FIGS. 6 and 7 are diagrams showing the relationship between observing magnification and illuminating field useful in explaining the function of the second embodiment of the invention.

The function of the second embodiment is substantially the same as that of the first embodiment except for some differences which will be apparent hereinafter. In the first embodiment, as the zooming system $OL_z$ reaches its limit point, for example, to provide the maximum observing magnification, 25X, as shown in FIG. 5A and if the illuminating field in the zoom illuminating system is at its intermediate point (e.g. $\phi_{20}$), the illuminating field should be manually changed to its minimum level $\phi_{25}$ or the observing magnification should be returned back to the minimum level under the interlocking condition as shown in FIG. 5B. In the second embodiment, however, the motor 31 is energized after the observing magnification reaches its maximum level, 25X, as shown in FIG. 6. As a result, the gear 34 is rotated in lost-motion by the clutch-gear mechanism including the spring 37 to arrest the rotation of the worm gear 35. The rotating force is transmitted from the motor 31 to the gear train (33, 52, 53, 44, 42, 23, 24 and 25) to continue the motion of the zoom illuminating system $IL_z$ such that the illuminating field will be changed independently to its minimum point $\phi_{25}$.

Figure 7:
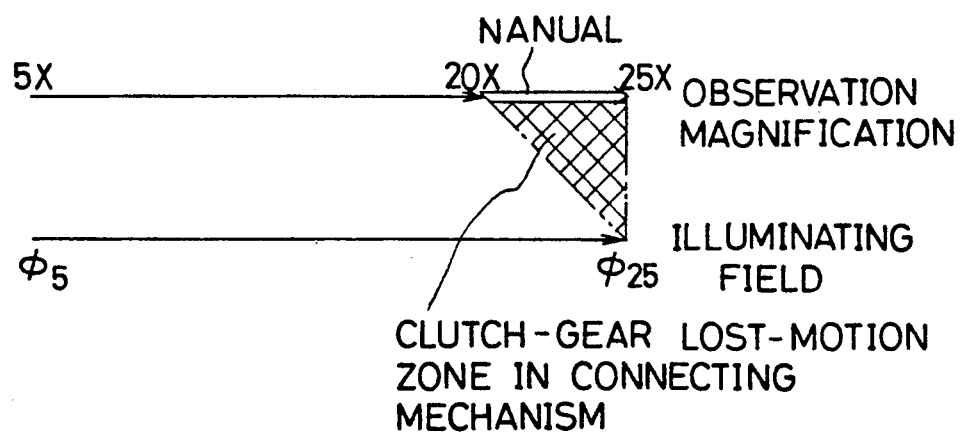

As shown by double dot-chain line in FIG. 4, the first driving shaft 36 may be extended outwardly through the housing wall B with the outward end 36' thereof having a manipulating knob 70 detachably mounted thereon. With the rotation of the manipulating knob 70, the first driving shaft 36 can be rotated to change the magnification of the zooming system $OL_z$ through the worm gears 35 and 11. If the biasing force in the spring 37 of the clutch-gear mechanism against the gear 34 is established to be larger than that of the spring 54 of the clutch-gear mechanism in the connecting mechanism 50, the rotation of the manipulating knob 70 allows the simultaneous movement of the zooming and illuminating systems when both the systems are not in their limit points. On the other hand, if the zoom illuminating system reaches its limit point, that is, the minimum level ($\phi_{25}$) as shown in FIG. 7, merely the zooming system can be actuated. With use of the manipulating knob 70, an advantage can be provided in that even if the motor 31 is not in use for any reason (e.g. power failure), the observing magnification and the illuminating field can be manually changed.

(Third Embodiment)

Figure 8:
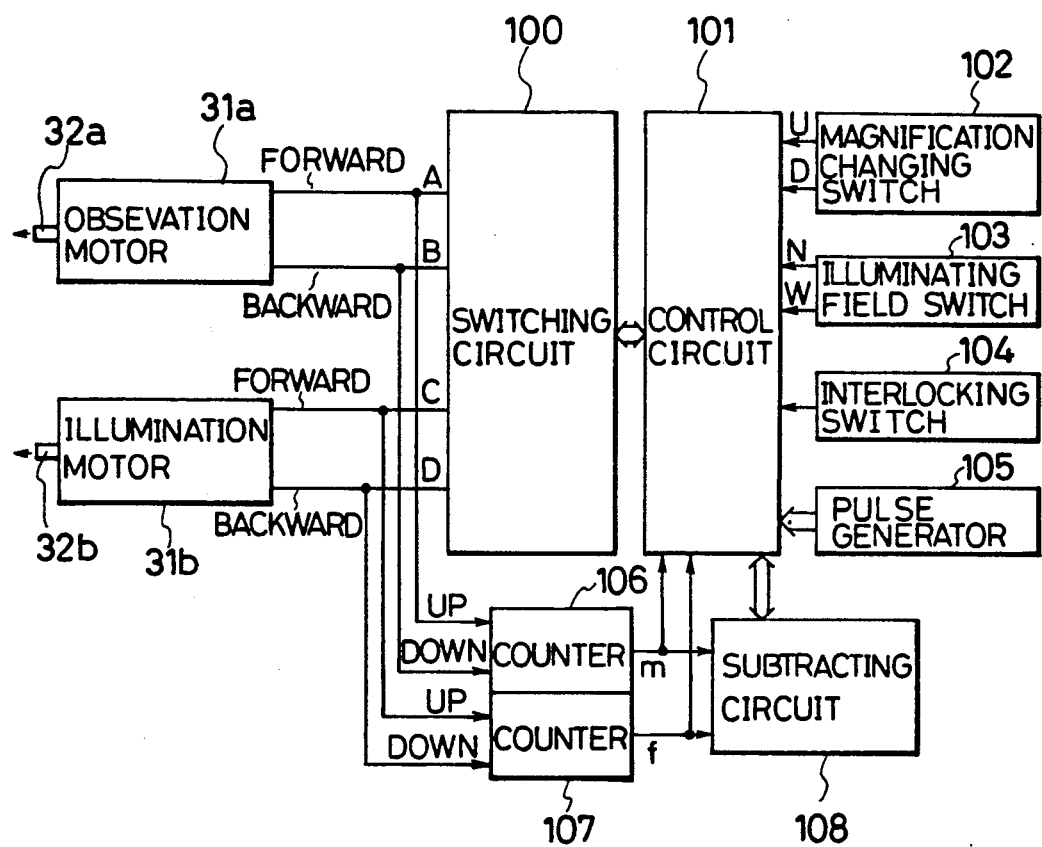
FIG. 8 is a block-diagram showing the third embodiment of the present invention.

Although the first and second embodiment have been described as to the mechanical interlocking mechanism between the zooming system and the zoom illuminating system, the third embodiment provides an electrical interlocking mechanism as shown in FIG. 8. The electrical interlocking mechanism comprises an observation motor 31a having its output shaft 32a which is operatively connected with the first driving shaft 36 through the known reduction gear box (not shown). The electrical interlocking mechanism also comprises an illumination motor 31b having its output shaft 32b which is operatively connected with the second or third driving shaft (41 or 22) through the known reduction gear box (not shown). The motors 31a and 31b are in the form of a pulse motor which has two input terminals on the forward and backward rotation sides. The pulse motor is adapted to be rotated forwardly or backwardly depending on pulses entered in either of the input terminals.

The forward and backward input terminals of each of the motors 31a and 31b are electrically connected with the corresponding pair of terminals (A and B; C and D) in the known switching circuit 100, respectively. The terminal A of the switching circuit 100 is coupled with the UP-side input terminal of the known Up-Down counter circuit 106 while the terminal B of the same is connected with the DOWN-side terminal of the counter circuit 106. The terminal C of the switching circuit 100 is connected with the UP-side input terminal of a similar Up-Down counter circuit 107 while the terminal D thereof is coupled with the DOWN-side input terminal of the counter circuit 107. Counted output signals from each of the counter circuit are applied to a subtracting circuit 108 and a control circuit 101 both of which are well-known in the art. The outputs of the subtracting circuit 108 are coupled to the control circuit 101.

The control circuit 101 is constructed with a microprocessor and controls the switching circuit 100 such that it will be determined to provide pulses from a pulse generator 105 to any one of the terminals A through D in the switching circuit 100. The control circuit 101 also is connected with a magnification changing switch 102 known as a foot switch at the output terminal U thereof for generating command signal representative of the increase of magnification and at the output terminal D for generating command signal representative of the decrease of magnification. The control circuit 101 is further coupled with an illuminating field switch 103 in the form of a foot or hand switch at the output terminal N for generating command signal representative of the narrowing of illuminating field and at the output terminal W for generating command signal representative of the widening of illuminating field. An interlocking switch 104 for generating INTERLOCK signal also is coupled with the control circuit 101 and may be in the form of a foot or hand switch.

When a main switch (not shown) is turned on, the control circuit 101 is energized to position the motor 31a at its minimum magnification location and the motor 31b at its maximum illuminating field point and to initialize all of the counters 106, 107 and subtracting circuit 108.

(a) Increase of the Magnification in the Interlocking Mode

When it is wanted to shift the zooming system $OL_z$ and the zoom illuminating system $IL_z$ in the interlocking mode, the interlocking switch 104 is turned on. When received a signal from the interlocking switch 104,. the control circuit 101 causes the terminals A and C of the switching circuit 100 to be turned on. If the magnification changing switch is then actuated to provide the command signal representative of increase of magnification from its terminal U and while the command signals are being applied to the control circuit 101, pulses from the pulse generator 105 to apply to the motors 31a and 31b through the terminals A and C of the switching circuit 100 such that these motors 31a and 31b will be rotated forwardly to actuate the zooming and illuminating systems simultaneously to increase the observing magnification and at the same time to narrow the illuminating field. At the same time, pulse outputs from the terminals A and C of the switching circuit 100 are entered into the terminals UP of the counters 106 and 107. As a result, the pulses are upwardly counted in the counters 106 and 107. If the magnification changing switch 102 is stopped, the control circuit 101 turns off the terminals A and C of the switching circuit 100 to deenergize the motors 31a and 31b.

(b) Decrease of the Magnification in the Interlocking Mode

As the magnification changing switch 102 is actuated to provide the command signals representative of decrease of magnification, the control circuit 101 receives the command signals through the terminal D of the switch 102 and then turns on the terminals B and D of the switching circuit 100. While the command signals are being applied from the switch 102 to the control circuit 101, pulses are supplied from the pulse generator 105 to the motors 31a and 31b to rotate them in the backward direction. Thus, the zooming and illuminating systems can be shifted to decrease the observing magnification and at the same time to widen the illuminating field. Pulses from the terminals B and D are downwardly counted by the counters 106 and 107.

(c) Change of the Magnification in the Non-Interlocking Mode

After the interlocking switch 104 has been turned off and when the magnification changing switch 102 is actuated, the control circuit 101 turns on the terminal A of the switching circuit 100 in accordance with the output of the terminal U of the switch 102 and the terminal B of the same in accordance with the output of the terminal D of the switch 102. As a result, pulses are applied from the pulse generator 105 to the motor 31a to rotate forwardly or backwardly such that the zooming system $OL_z$ will be only actuated to change the observing magnification.

Pulse outputs from the terminal A or B is entered into the counter 106 wherein the number of pulses is counted up or down, alternatively.

(d) Change of the Illuminating Field in the Non-Interlocking Mode

If the interlocking switch 104 is in its OFF state and when the illuminating field changing switch 103 is actuated to apply the command signals from its output terminal N to the control circuit 101, the latter turns on the terminal C of the switching circuit 100 so that the pulses will be transferred to the motor 31b to energize it forwardly. On the other hand, if the command signals from the terminal W of the switch 103 are entered into the control circuit 101, the circuit 101 turns on the terminal D of the switching circuit 100 such that the pulses will be entered into the motor 31b to rotate it in the backward direction. Thus, only the zoom illuminating system $IL_z$ can be actuated independently. The pulses from the terminals C and D of the switching circuit 100 are counted up or down by the counter 107.

(e) Re-start of the Interlocking Mode

After the zooming system $OL_z$ or the zoom illuminating system $IL_z$ has been actuated independently and if the interlocking switch 104 is turned on, a command signal therefrom is received by the control circuit 101 which in turn causes the subtracting circuit 108 to read the counts m and f in the counters 106 and 107. These counts m and f are then subjected to subtraction. The results including their signs are applied to the control circuit 101. If (m−f) is plus, that is, if the observing magnification is in the side higher than that corresponding to the illuminating field at that time, the control circuit 101 turns on the terminal C of the switching circuit 100 to enter pulses corresponding to the absolute value m−f to the illumination motor 31b. As a result, the illuminating field will be interrelated with that observing magnification. Thereafter, the magnification changing switch 102 is again actuated to turn on the set of terminals A and C or terminals B and D in the switching circuit, depending on the operational command from the switch 102. In such a manner, the zooming and illuminating systems will be actuated simultaneously.

If the result (m−f) is minus, that is, if the illuminating field is narrower than that corresponding to the observing magnification at that time, the control circuit 101 turns on the terminal D of the switching circuit 100 to enter pulses corresponding to the absolute value m−f. Thus, the motor 31b is rotated in the backward direction to interrelate the illuminating field with that observing magnification. Thereafter, the motors 31a and 31b will be simultaneously rotated forwardly or backwardly in accordance with the command from the magnification changing switch 102 so that the zooming and illuminating systems $OL_z$, $IL_z$ can be actuated simultaneously.

Although the first to third embodiments of the present invention have been described as to the optical zooming systems for changing the observing magnification and the illuminating field, it is to be understood that the present invention will not be limited to such configuration. For example, in the optical observation system the present invention can use a known turret type magnification changing system wherein a plurality of lenses having different magnifications are arranged around the periphery thereof and each of the lenses can be selectively located in the optical path alternatively. On the other hand, in the optical illuminating system, there can be used a turret type aperture system wherein a plurality of apertures having different openings are arranged about the periphery thereof and each of the apertures may be inserted alternatively into the optical path to change the illuminating field. Moreover, the gear train used in each of the first and second embodiment may be replaced by a belt drive mechanism.

We claim:

1. An optical illuminating and observing apparatus comprising:
    an optical observing system;
    means for changing the magnification of said optical observing system, comprising an optical magnification changing system, a first drive mechanism for driving said optical magnification changing system, and drive means for supplying a driving force to said first drive mechanism;
    an optical illuminating system;
    means for changing the illuminating field of said optical illuminating system, comprising an optical illuminating field changing system and a second drive mechanism for driving said optical illuminating field changing system; and
    selective drive means for selectively driving said optical magnification changing system either independently of said optical illuminating field changing system or in an interlocking relationship with said optical illuminating field changing system, wherein said selective drive means comprises a connecting mechanism selectively connectable with said second drive mechanism to transmit a driving force from said drive means to said second drive mechanism.

2. The optical illuminating and observing apparatus of claim 1, wherein at least one of said first drive mechanism, said second drive mechanism, and said connecting mechanism comprises lost-motion transmitting means for transmitting a driving force from said drive means to said first drive mechanism in lost-motion when said optical magnification changing system is moved to its limit of movement, and for transmitting the driving force from said drive means to said second drive mechanism in lost-motion when said optical illuminating field changing system is moved to its limit of movement.

3. The optical illuminating and observing apparatus of claim 2, wherein said drive means comprises a motor, and wherein said first and second drive mechanism and said connecting mechanism are defined by a gear train, said lost-motion transmitting means comprising a clutch gear.

4. The optical illuminating and observing apparatus of claim 1, wherein said optical observing system and said optical illuminating system each comprises an optical zooming system.

5. An optical illuminating and observing apparatus comprising:
    an optical observing system;
    means for changing the magnification of said optical observing system, comprising an optical magnification changing system, a first drive mechanism for driving said optical magnification changing system, and a first motor for supplying a driving force to said first drive mechanism;
    an optical illuminating system;
    means for changing the illuminating field of said optical illuminating system, comprising an optical illuminating field changing system, a second drive mechanism for driving said optical illuminating field changing system, and a second motor for supplying a driving force to said second drive mechanism;

a control circuit for controlling said first and second motors to activate them simultaneously or independently, wherein said control circuit includes detecting means for detecting a relative deviation between the magnification of said optical magnification changing system and the illuminating field of said optical illuminating field changing system, said control circuit being adapted to activate at least one of said first and second motors to adjust the relationship between the magnification and the illuminating field based on information from said detecting means.

6. The optical illuminating and observing apparatus of claim 5, wherein said optical observing system and said optical illuminating system each comprises an optical zooming system.

* * * * *